United States Patent
Nagarajan

(10) Patent No.: US 6,522,791 B2
(45) Date of Patent: Feb. 18, 2003

(54) DYNAMIC USER INTERFACE WITH SCANNED IMAGE IMPROVEMENT ASSIST

(75) Inventor: Ramesh Nagarajan, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 216 days.

(21) Appl. No.: 09/767,967

(22) Filed: Jan. 23, 2001

(65) Prior Publication Data

US 2002/0097452 A1 Jul. 25, 2002

(51) Int. Cl.[7] .................................................. G06K 7/10
(52) U.S. Cl. ...................................... 382/321; 358/522
(58) Field of Search ................................ 358/474, 505, 358/512, 513, 406, 482, 484, 522, 504; 382/312, 321

(56) References Cited

U.S. PATENT DOCUMENTS

| | | | | |
|---|---|---|---|---|
| 4,106,060 A | * | 8/1978 | Chapman, Jr. | 358/256 |
| 4,207,598 A | * | 6/1980 | Reich | 358/257 |
| 4,748,317 A | * | 5/1988 | Satoh | 235/462 |
| 4,811,111 A | * | 3/1989 | Kurokawa | 358/257 |
| 4,893,333 A | * | 1/1990 | Baran | 379/100 |
| 5,659,164 A | * | 8/1997 | Schmid | 235/375 |
| 5,881,166 A | * | 3/1999 | Farrell | 382/168 |
| 6,208,436 B1 | * | 3/2001 | Cunningham | 358/474 |
| 6,307,972 B1 | * | 10/2001 | Riley | 382/237 |
| 6,389,162 B2 | * | 5/2002 | Maeda | 382/172 |
| 6,426,806 B2 | * | 7/2002 | Melen | 358/468 |
| 2001/0053248 A1 | * | 12/2001 | Maeda | 382/165 |

FOREIGN PATENT DOCUMENTS

JP  11355574  * 12/1999  .......... H04N/1/407

* cited by examiner

*Primary Examiner*—Jerome Grant, II
(74) *Attorney, Agent, or Firm*—Perman & Green, LLP

(57) ABSTRACT

The present invention generally relates to a digital scanner for scanning images and is directed to a method and apparatus for accurately scanning documents and for processing digital data to generate digital images as accurately as possible. The scanning system described in this application provides recommended settings for image mode and image parameters to assist the user in adjusting the settings to match the original document. The image data is analyzed to determine the optimum settings.

12 Claims, 8 Drawing Sheets

DYNAMIC USER INTERFACE WITH SCANNED IMAGE IMPROVEMENT ASSIST

FIELD OF THE INVENTION

The present invention generally relates to a digital scanner for scanning images. More specifically, the present invention is directed to a method and apparatus for accurately scanning documents and for processing digital data to provide digital images stored in memory, which can be retrieved for printing on support material or for displaying on a display screen. The system of the present invention analyzes the scanned image data and recommends settings to improve the image quality.

BACKGROUND OF THE INVENTION

In a conventional digital scanner, a light source is used to illuminate a document to be scanned. The conventional digital scanner also includes a platen glass upon which the document rests and a platen cover. The light emmitted by the light source illuminates the document and is reflected off and imaged by an optical system or lens system towards either a CCD sensor array or full width array, which converts the reflected light into electrical signals. An image processing circuit electronically registers the image, and converts the electrical signals into digital image data for use by an image output terminal, network citizen, or memory device.

A printer or other digital imaging system is typically coupled to a digital scanner for scanning an original image (e.g. document) and employs an initial step of charging a photoconductive member (photoreceptor) to a substantially uniform potential. The charged surface of the photoconductive member is exposed to a light image of the original document to selectively dissipate the charge in selected areas irradiated by the light image. This procedure records an electrostatic latent image on the photoconductive member corresponding to the informational areas contained within the original document being reproduced. The latent image is then developed by bringing a developer including toner particles into contact with the latent image. The toner particles are attracted to the latent image, forming a toner image on the photoconductive member, which is subsequently transferred to a copy sheet. The copy sheet with the toner image is then advanced to a fusing station for permanently affixing the toner image to the copy sheet.

There is a need to provide digital scanners to satisfy a wide variety of requirements based on customer environments (production equipment, office equipment, and home equipment). The traditional approach was to provide different versions of software for different customer environments to satisfy the customers' various requirements. For example, in a production environment, image quality is considered very important and the operators (users) try to reproduce their pictorials as true to the original as possible. In this type of operating environment, the user interface might provide a magazine mode with weak background suppression and the tonal reproduction curve (TRC) would be a one-to-one TRC. In an office environment, the users frequently copy originals, which were printed by a laser printer. Therefore, these users are more concerned about the second side showing through the paper, background suppression and text quality. Therefore, a higher contrast TRC is used. Although prior art scanners can save manually inputted default settings, there is a need for a dynamic user interface to adjust the image parameters of the digital scanner to meet various customer requirements.

In more general use, where the user is not as sophisticated, the software provides settings and groups of settings in accordance with the mode of use. A typical selection of modes includes: general use default mode, text mode, coarse halftone mode, high frequency halftone mode, photograph mode, laser print/newspaper mode (coarse halftone and text), magazine mode (high frequency halftone and text), and photographic and text mode. Each of these modes include predetermined image parameter settings typically applicable to a particular mode. In addition advanced user options allow the customization of specific settings. The settings generally include: auto-background suppression level, lighter/darker and contrast setting, tone reproduction curve, filter level (sharpness/descreen level), and rendering method. With this enormous available combination of variables, most general users have great difficulty in determining which settings are right for a particular application and most will opt for the selection of default settings or a particular mode. In some instances even the selection of a suitable mode is beyond the capability of the user.

It is a purpose of this invention to provide the user, through the graphical user interface of the associated device, with recommended settings based on an analysis of the scanned image data.

SUMMARY OF THE INVENTION

The present invention addresses the need for fast, high quality digital scanners, capable of being connected to a wide array of copiers, printers, computers, networks, facsimile machines, etc., and capable of scanning and producing complex and interesting images to be stored, printed or displayed. The images may include text, graphics, and scanned or computer-generated images. Therefore, the present invention is directed toward a digital scanner capable of quickly acquiring, processing, storing and outputting digital images of documents. In order to improve the image output of the scanner, the present invention provides a system in which optimum image parameter settings are provided through the graphical user interface. The optimum settings are determined by an analysis of the scanned image data. The recommended settings could be a specific operational mode or a specific parameter depending upon the image data analysis.

Apparatus is provided that receives the image data of a scanned original or series of original documents. This image data file will include a full page histogram which contains the graphic data for a page of the document and a pixel tag histogram which identifies each pixel by its type. The histograms are processed to compare the default or current customized settings to determine compatibility between such settings and the image data. This processing results in a group of image parameter setting recommendations either by mode or by specific parameter. The user has the option to adopt the recommended settings.

DETAILED DESCRIPTION OF THE PREFERRED EMBODIMENTS

Figure 1:
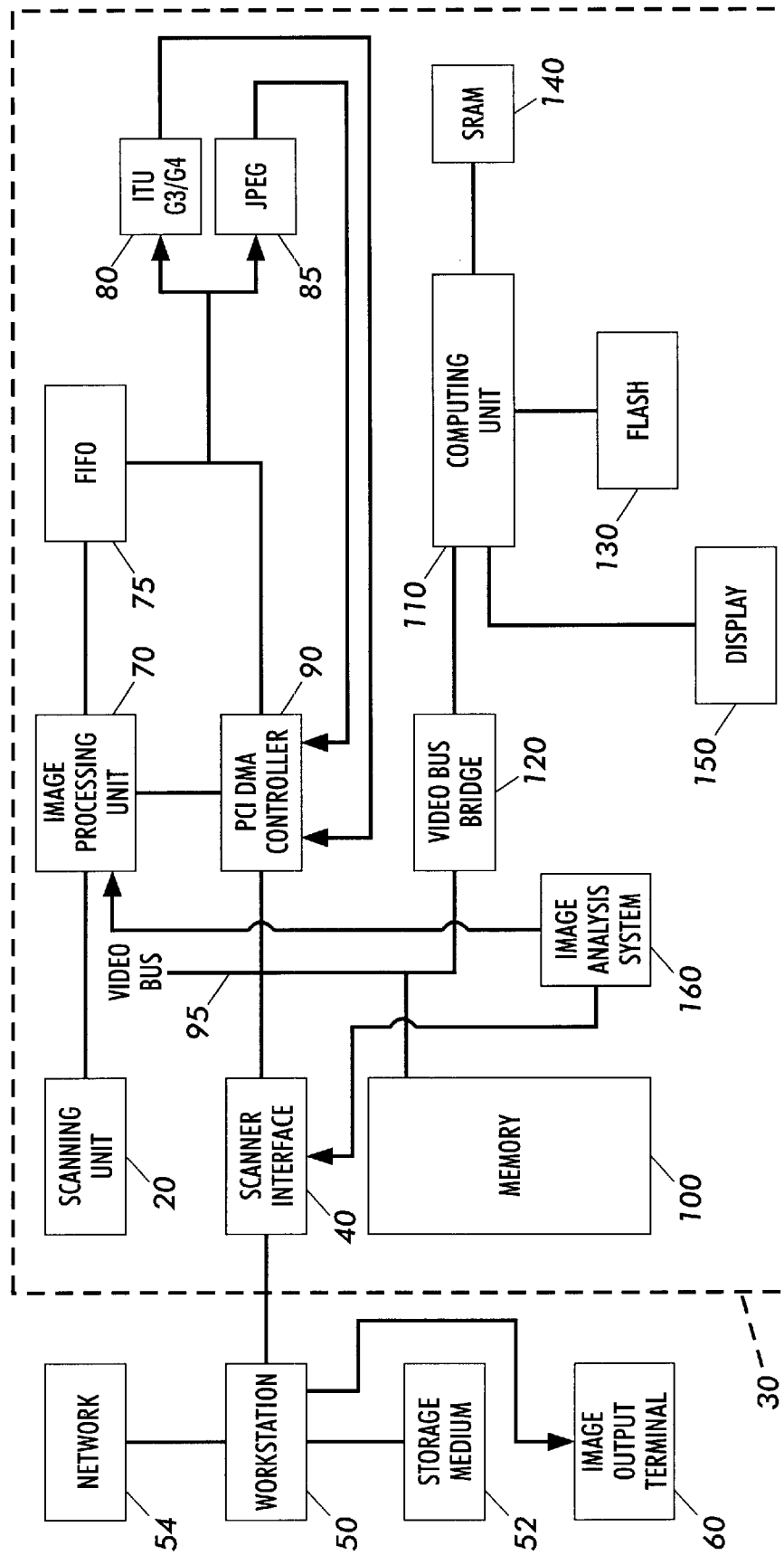
FIG. 1 is a block diagram illustrating the electronic architecture of a digital scanner system utilizing the subject invention.
Figure 2A:
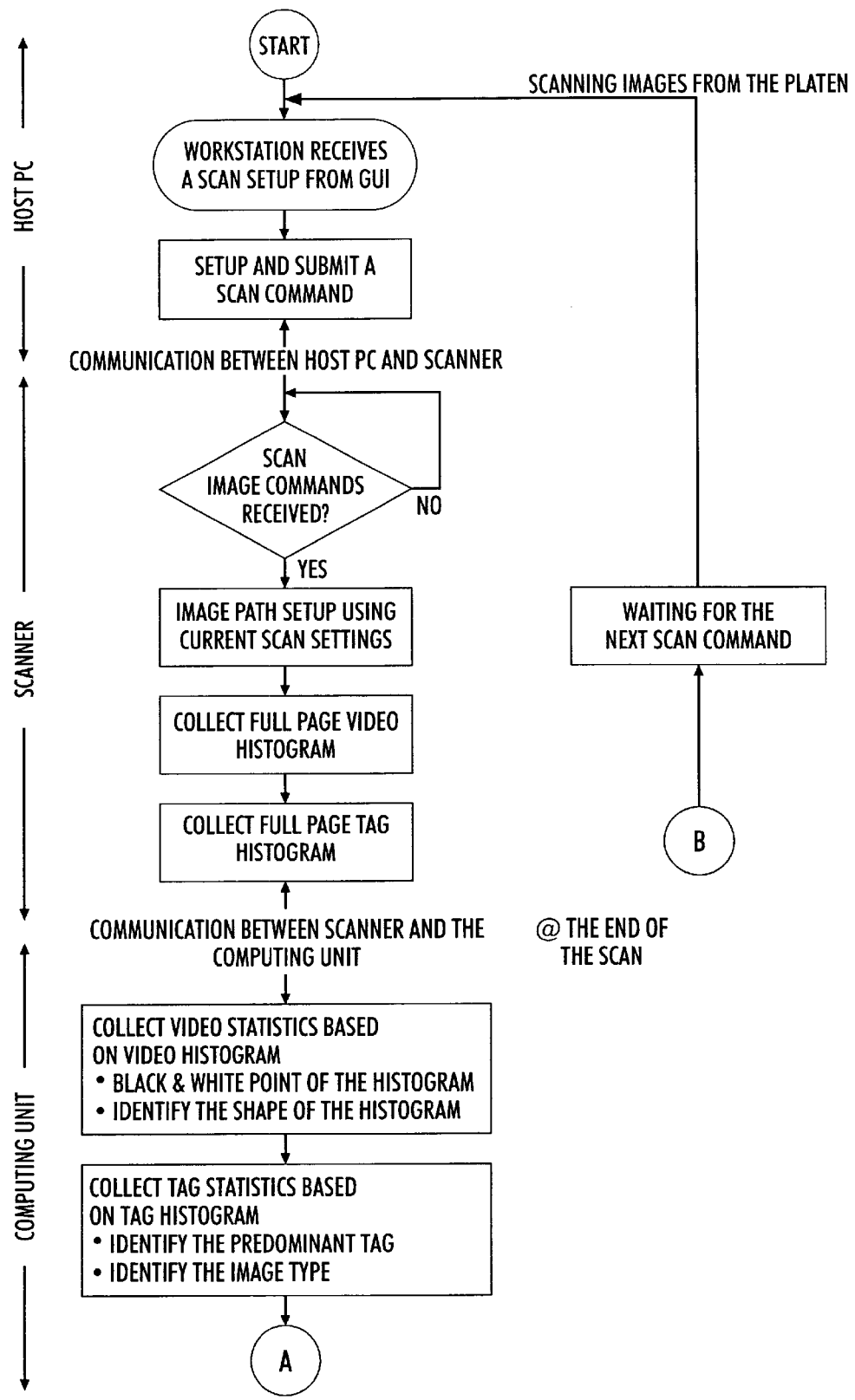
FIGS. 2a–2e are a series flow diagrams showing the process of this invention.
Figure 2B:
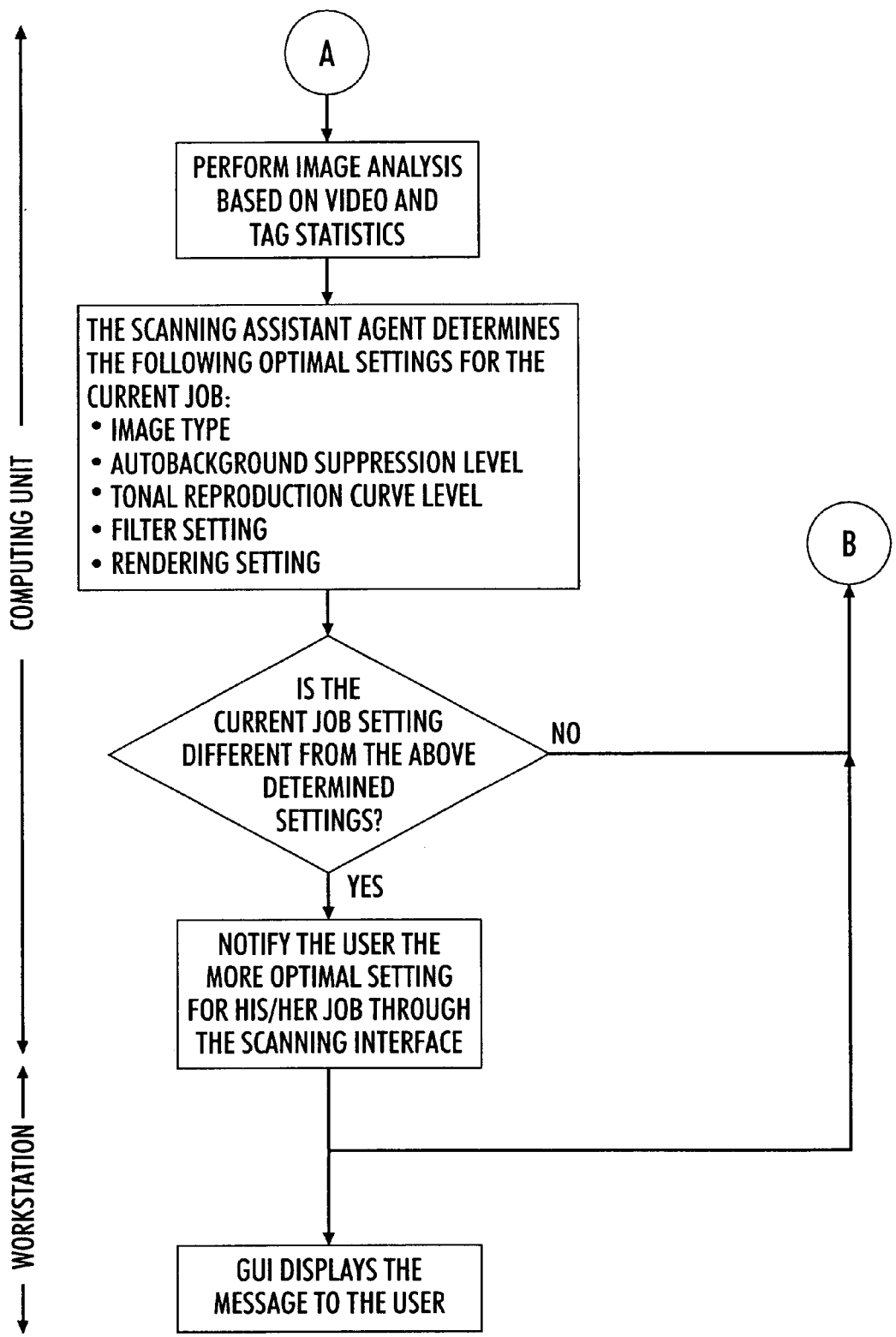
Figure 2C:
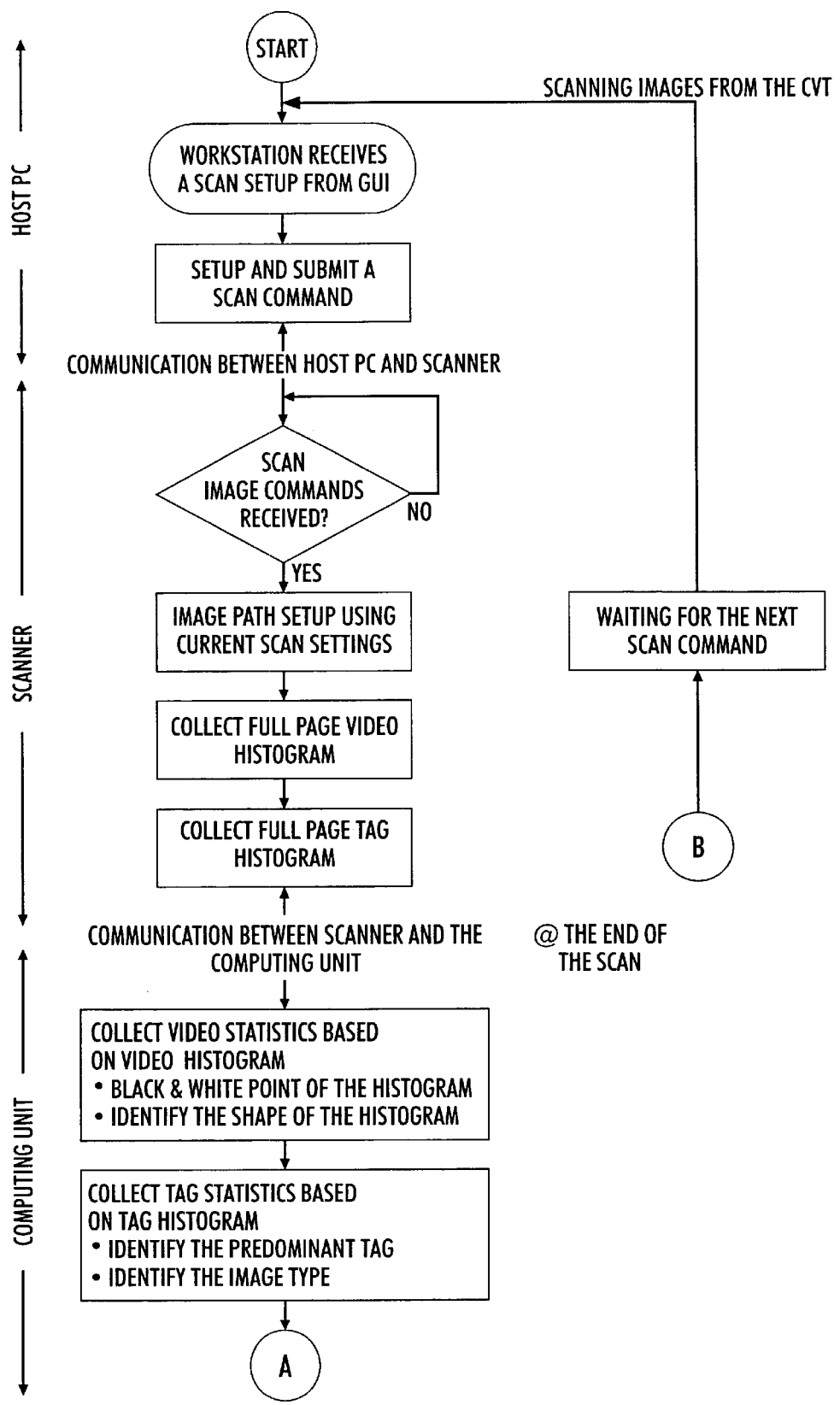
Figure 2D:
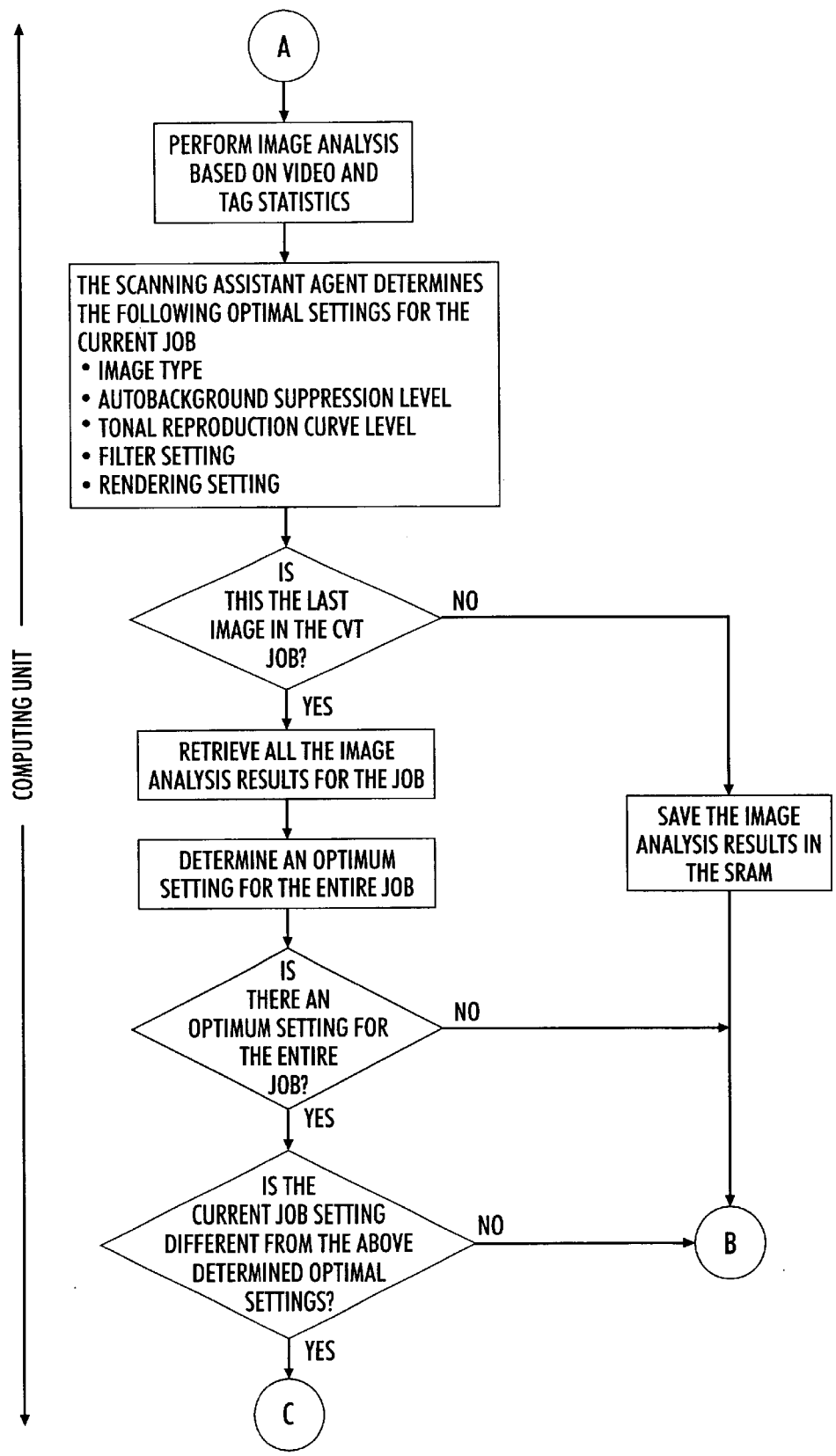
Figure 2E:
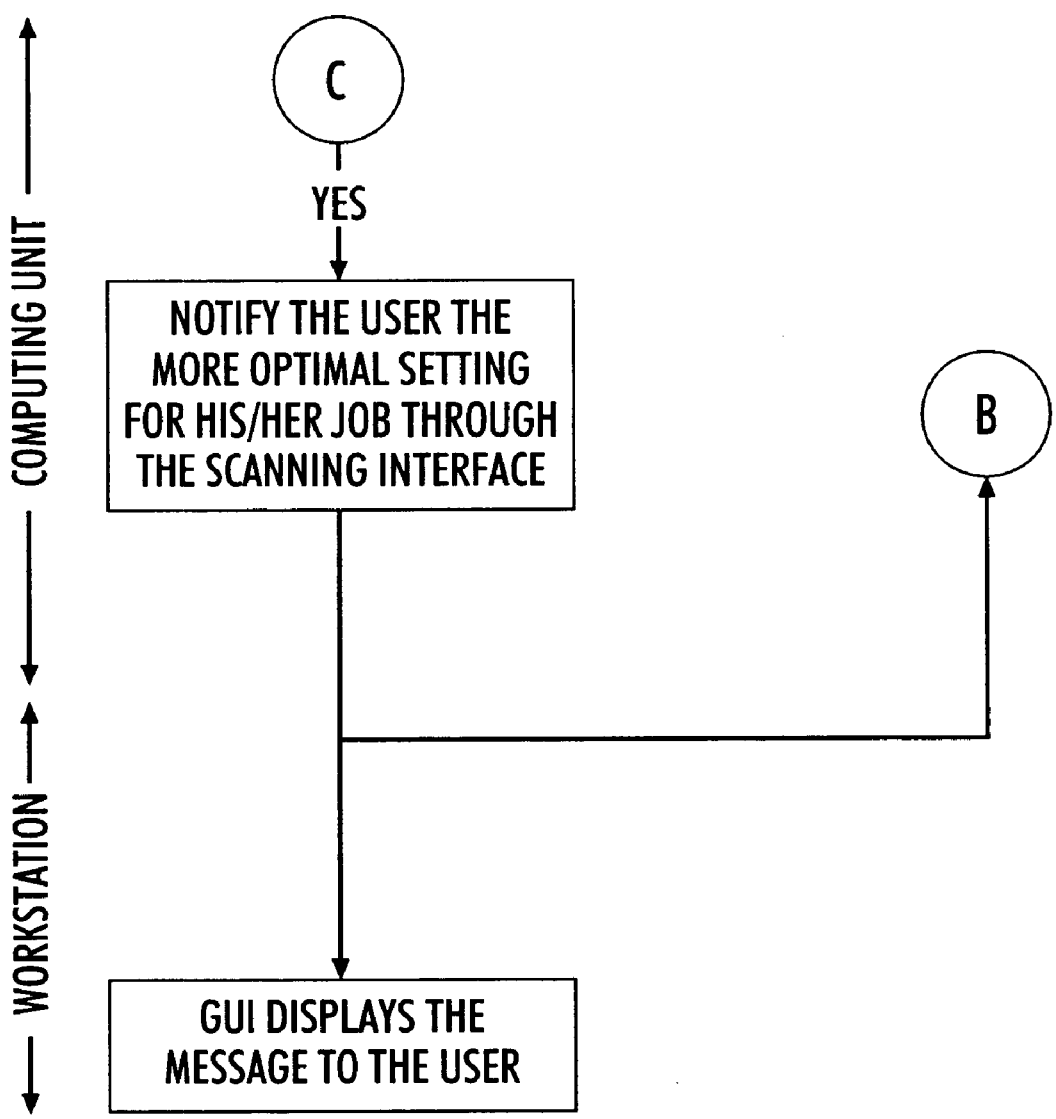

For a general understanding of the present invention, reference is made to the drawings. In the drawings and in the specification, like reference numerals have been used throughout to designate identical or equivalent elements or steps.

A scanning unit 20 forms part of a digital image processing system such as a printing machine. The scanning unit 20 includes a light source which is used to illuminate a document to be scanned. In a platen type-scanning situation, the document usually rests upon a glass platen which supports the document for scanning purposes. The document may be placed on the glass platen by an operator, feeder, or document handler, which places the document on the glass platen.

A backdrop portion (platen cover) is placed over the document to prevent stray light from leaving the scanning area and to provide a background from which the document can be distinguished. The light reflected from the document passes through a lens subsystem (not shown) so that the reflected light impinges upon an image sensing unit, such as a charged coupled device (CCD) array or a full width array. An example of a full width array is found in U.S. Pat. No. 5,473,513. U.S. Pat. Nos. 5,748,344; 5,552,828; 5,691,760; 5,031,032; 5,545,913; and 5,604,362 provide examples of different full width arrays. A full width array typically comprises one or more linear arrays of photosites, wherein each linear array may be sensitive to one or more colors. In a full color digital scanner, the linear arrays of photosites are used to produce electrical signals which are converted to color image data representing the document that is being scanned. However, in a black/white scanner, preferably only one linear array of photosites is utilized to produce electrical signals which are converted to black and white image data.

The electronic architecture of a digital scanner system 30 including the scanning unit 20, for use with this invention is shown in FIG. 1. The digital scanner 30 is coupled to a workstation 50 by way of a scanner interface 40. An example of a scanner interface 40 is a SCSI interface. Examples of the workstation 50 include a personal computer and a computer terminal. The workstation 50 includes and/or accesses a storage medium 52. The workstation 50 is preferably adapted to communicate with a computer network 54, and the Internet either directly or through the computer network 54. The workstation 50 includes a graphical user interface. The digital scanner system 30 is preferably coupled to at least one image output terminal (IOT) 60, such as a printing system. The digital scanner system 30 may also be connected to a network, main frame computer through a computer terminal, or other host-computing unit, which has a graphical user interface.

The scanning unit 20 scans an image and converts the analog signals received by the image sensing unit 28 into digital signals (digital data). An image processing unit 70 registers each image, and preferably executes signal correction to enhance the digital signals. As the image processing unit 70 continuously process the digital signals, the FIFO (first in first out buffer) 75 temporarily stores the digital data outputted by the image processing unit 70, and transmits the digital data to the data compression unit 80. The compressed digital data is stored in memory 100 via controller 90 and video bus 95. The operator may bypass the compression step so that the digital data processed by the image processing unit 70 is sent through the FIFO 75 and directly stored in memory 100 by way of controller 90.

A computing unit 110, such as a microprocessor, is operationaly coupled to the various functional modules of the scanner system 30, including scanner interface 40, memory 100, controller 90, FLASH 130, static RAM 140, and display 150 by way of the video bus 95 and video bus bridge 120. In addition computing unit 110 is connected to the scanning unit 20 and the image processing unit 70 by way of a control/data bus. In this manner computing unit 110 controls the overall functioning of the system 30 and the flow of image data through the various components. Although individual modules are shown for illustrative purposes, it should be noted that it some instances the modules may form part of a larger microprocessor without altering their function.

Figure 3:
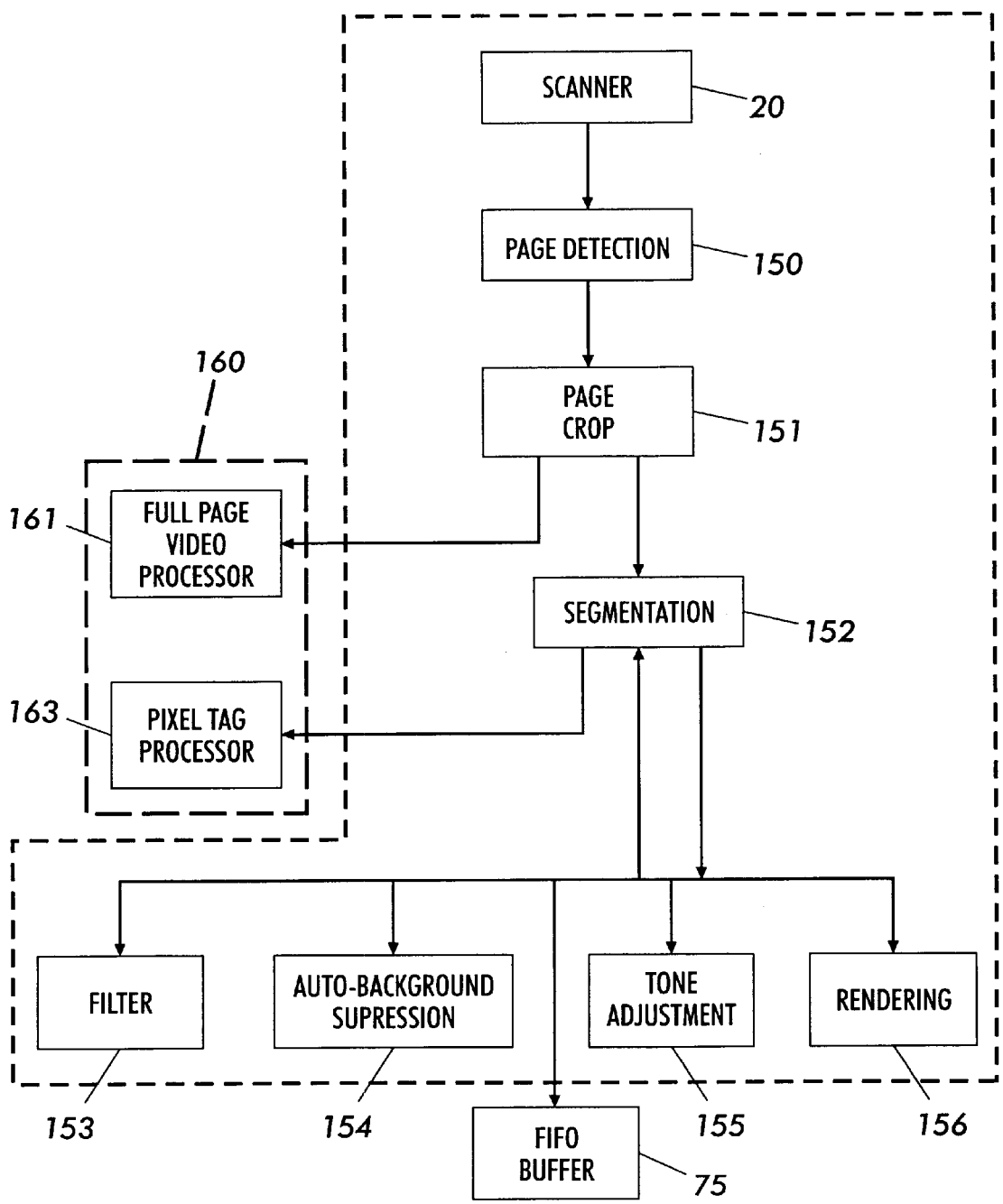
FIG. 3 is a block diagram of an image processing unit as used in the scanner system of FIG. 1.
Figure 4:
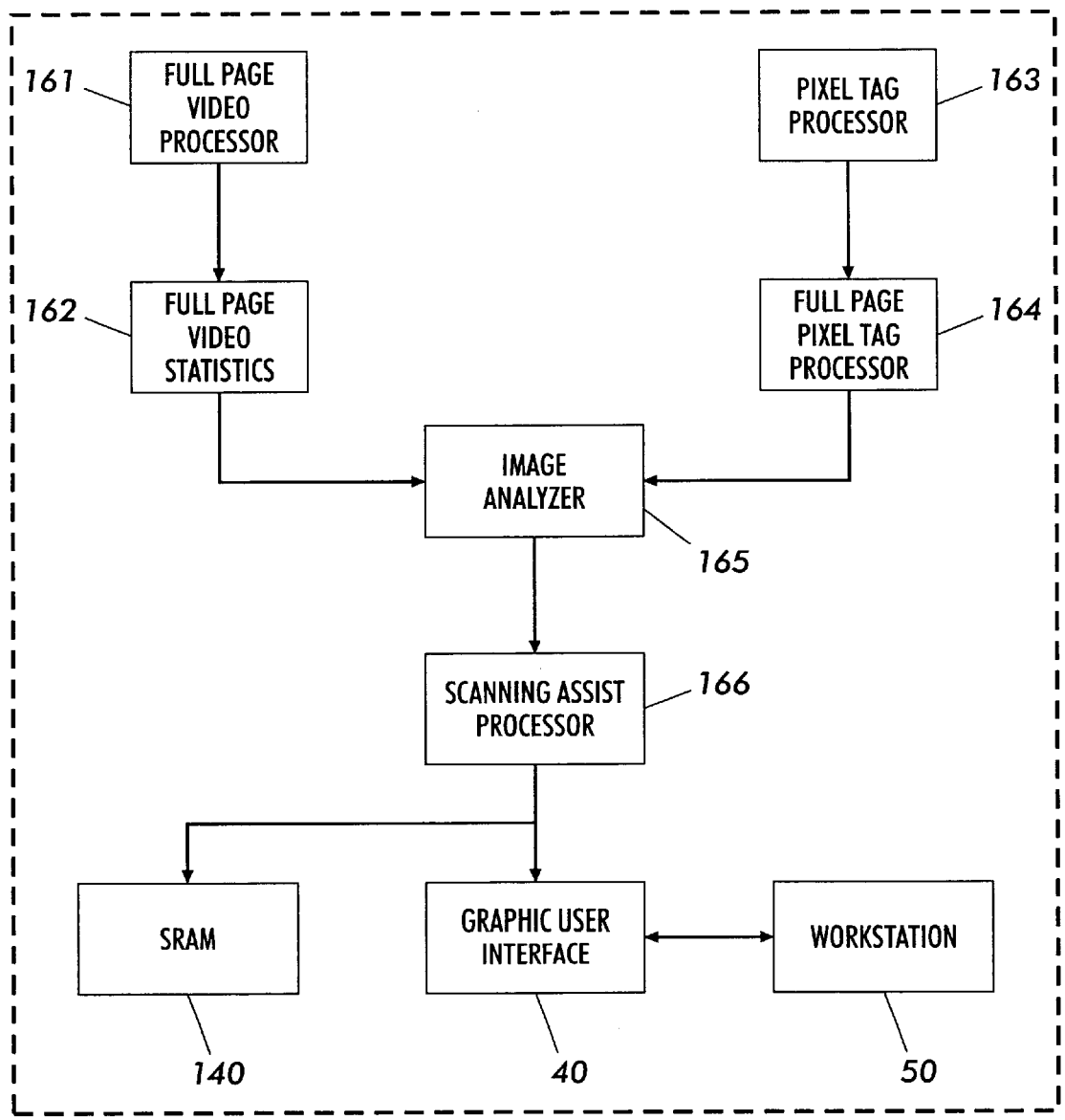
FIGS. 4 is block diagram of the image analysis system of this invention.

As shown in FIG. 3, the image processing unit 70 according to this invention, includes a series of processing modules which convert the analog image data of the scanned image to digital form. This is accomplished by page detection module 150, page crop module 151 and segmentation module 152. Full page video data is available from detection module 150 and such image data is defined in pixel form by segmentation module 152. The various parameters of the image data may be selected through filter module 153, auto-background suppression module 154, tone reproduction curve module 155, and rendering module 156.

In accordance with this invention an image data analyzer 160 is connected to receive the full page video histogram of the scanned image as well as the pixel tag histogram obtained from the segmentation module 152. The full page image data provides data which assists in the classification of the image into a particular mode. The pixel tag histogram contains information with respect to the pixel type, (i.e. one of the 32 classes of pixels). This data assists in the analysis of individual image parameter. As previously indicated, in general, the available mode selection includes: general use default mode, text mode, coarse halftone mode, high frequency halftone mode, photograph mode, laser print/newspaper mode (coarse halftone and text), magazine mode (high frequency halftone and text), and photographic and text mode. The parameters that are typically set or adjusted include: auto-background suppression level, lighter/darker and contrast setting, tonal reproduction curve, filter level (sharpness/descreen level), and rendering method.

Image data analyzer 160 includes a full page video image module 161 which operates to generate a histogram representing said video data. Further data based on the full page histogram is collected in video statistic module 162. As another part of the image data analyzer 160, a pixel tag histogram is generated in pixel tag module 163 and data based on the pixel tag histogram is collected in pixel tag statistic module 164. The processed image data from each source is combined and further processed in data analyzer 165 to determine optimum settings for both mode and specific parameters. The optimum settings are then compared to the current settings, in the scanning assist module 166, to generate recommended adjustments. The adjustment data may be stored in SRAM 140 and communicated to the user through the scanner interface 40 which may include workstation 50. By operating through the scanner interface, the user has the option to select the optimum settings.

A flow diagram illustrating a method of providing optimum setting recommendations to the graphical user interface of digital scanner 30 is presented in sequential FIGS. 2a–2e. Once the digital scanner 30 and workstation 50 are booted up (200) and the workstation 50 receives a scan setup command from the operator (user) by way of the graphical user interface (210), a scan image command may be transmitted to the digital scanner 50 (220 and 230). The scan image command provides the information about the scan job. It contains the list of current user settings that are necessary to control the digital scanner 30 which includes the settings (parameters) for the scanning unit 20, and the image processing unit 70. The current settings are used for the initial scan.

After an initial scan is accomplished by scanner 20 using the current settings, the image data is analyzed by full page processor 161 to generate a full page video histogram. In addition a pixel tag histogram is generated by pixel tag processor 163 based on the image data from segmentation module 152. Video statistics are then collected in module 162 for further analysis and the pixel tag statistics are similarly collected at module 164. For further processing, the full page statistics are analyzed to determine, among other things, the black and white point of the full page histogram as well as the shape of this histogram. Additionally the pixel tag statistics are analyzed to identify the predominent pixel type and the overall image type. The image type analysis maybe accomplished, for example, by a comparison of the pixel tag statistics to a pixel tag look up table based on image type.

This information is processed to obtain a series of optimum settings for image type, auto-background suppression, tone reproduction curve, filter, and rendering. These recommended settings are further processed and compared with the current settings by the scanning assist processor 166 to present recommended settings adjustments to the user through user interface 40. The recommended settings may be stored in the static random access memory 140.

In the event that the original document contains multiple pages (for example, while scanning from the CVT or the document feeder), the second page scan will trigger a second analysis of the image data and the analysis will continue until all of the statistics are collected. Image analyzer 165 will generate optimum settings relating to the entire document. The user is presented with the overall settings recommendations through the user interface. These settings may be used or further adjusted by the operator of the scanning system 30.

The proper settings may have a pronounced affect on the output image quality. For example: regarding the autobackground suppression parameter, when making black and white scans of originals with colored or shaded backgrounds, the digital scanner 30 will render the background as halftone. Since the background may make the foreground image unreadable, this setting may be used to remove the background shading. The different suppression levels provided (e.g. mild, normal, strong and very strong) for background suppression dictates the amount of background that needs to be suppressed; regarding the filtering parameter, there are at least two types of filtering settings available to the operator. One type of filter is a Sharpen filter that increases edge contrasts in the image. This has the effect of making objects stand out and a proper setting will result in sharp, clean edges. The different levels of sharpness (e.g. 0 to 5) allow the user to pick the amount of enhancement that needs to be applied to the input image. Another type of filter is a descreen filter. A descreen filter is primarily used for removing halftone screens from the original image. The different levels of descreen filter (e.g. 0 to 5) allow the user to pick the amount of descreening (or blurring) to be applied to the input image; and regarding the rendering parameter, rendering converts the input 8 bits per pixel gray image into less than 8 bits per pixel image (typically 1 bit per pixel binary image). However, other gray scales may be used with higher bits/pixel such as 10 or 16 bits/pixel. There are at least four types of rendering provided to the user—threshold, error diffusion, halftone and hybrid screen. Threshold rendering converts all pixels below a set value to black and all pixels above that set value to be white. This is useful for solid text and provides a very high contrast output. Error Diffusion gives the illusion of gray shading in the output image by preserving the average gray level of the input image within a local area. For each incoming pixel, error diffusion converts an 8 bit value to 1 bit value and then propagates or diffuses the error introduced to the pixels downstream (that are yet to be binarized). The end result is a black and white image that has the appearance of gray shades, preserving the appearance of gradient filled and halftoned text. Halftones use a grid-like pattern of dots to give the appearance of shading. The incoming image is compared against a set of threshold array (also called halftone screen thresholds) and a binary output is generated. Hybrid screening combines halftoning and error diffusion rendering methods. A modulation level allows the user to control the weighting to be applied to each of the two rendering method. Other types of image parameter settings may also be analyzed.

In this manner the confusion caused by the adjustment of image parameters by the user is somewhat alleviated. The user/operator is presented with clear options for adjusting the various settings and settings are based on a reliable analysis of the image data.

While the invention has been described in detail with reference to specific and preferred embodiments, it will be appreciated that various modifications and variations will be apparent to the artisan. All such modifications and embodiments as may occur to one skilled in the art are intended to be within the scope of the appended claims.

What is claimed is:

1. An image improvement system for determining the optimum settings for image reproduction by a scanner which is designed to read, based on current settings, an image from an original document and generate a digital image data file representing said document, said system comprising:

an image data processor which generates data from which a full page video histogram and a pixel tag histogram may be generated based on said digital image data file;

an image analyzer processor which generates said full page video histogram and said pixel tag histogram and collects statistics based on said full page video histogram and said pixel tag histogram, analyzes said statistics, and generates recommended settings for image mode and image parameter settings, based on said statistics, for improving said image reproduction of said scanner;

a scanning assist processor for comparing said recommended settings with current settings and generating recommended adjustments; and a user interface for receiving said recommended adjustments and presenting said adjustments to a user.

2. A system for determining the optimum settings for image reproduction by a scanner which is designed to read, based on current settings, an image from an original document and generate a digital image data file representing said document, said system, as described in claim 1, wherein the image processor further comprises:

a page detection processor for generating a first set of data representing a full page of said image data file;

a segmentation processor for generating a second set of data which defines said image data in pixel form including a tag identification for each pixel; and wherein said histograms are generated based on an analysis of said first and second sets of data.

3. A system for determining the optimum settings for image reproduction by a scanner which is designed to read, based on current settings, an image from an original document and generate a digital image data file representing said document, said system, as described in claim 1, wherein said image mode setting includes at least one setting selected from the group comprising general use default mode, text mode, coarse halftone mode, high frequency halftone mode, photograph mode, laser print/newspaper mode (coarse halftone and text), magazine mode (high frequency halftone and text), and photographic and text mode.

4. A system for determining the optimum settings for image reproduction by a scanner which is designed to read, based on current settings, an image from an original document and generate a digital image data file representing said document, said system, as described in claim 1, wherein said image parameter setting includes at least one setting selected from the group comprising auto-background suppression level, lighter/darker and contrast setting, tonal reproduction curve, filter level (sharpness/descreen level), and rendering method.

5. A scanning system for reproducing an image from an original document comprising:

a scanner for receiving an original document and generating an image data file representing said document;

an image data processor which converts said image data file to a digital image data file having full page video characteristics and pixel characteristics contained therein;

an image analyzer processor for generating a full page video histogram and a pixel tag histogram, collecting statistics based on said full page video histogram and said pixel tag histogram, analyzing said statistics, and generating recommended settings for image mode and image parameter settings, based on said statistics, for improving said image reproduction of said scanner;

a scanning assist processor for comparing said recommended settings with current settings and generating recommended adjustments; and a user interface for receiving said recommended adjustments and presenting said adjustments to a user.

6. A scanning system for reproducing an image from an original document, as described in claim 5, wherein the image processor further comprises:

a page detection processor for generating a first set of data representing a full page of said image data file;

a segmentation processor for generating a second set of data which defines said image data in pixel form including a tag identification for each pixel; and wherein said histograms are generated based on an analysis of said first and second sets of data.

7. A scanning system for reproducing an image from an original document, as described in claim 5, wherein said image mode setting includes at least one setting selected from the group comprising general use default mode, text mode, coarse halftone mode, high frequency halftone mode, photograph mode, laser print/newspaper mode (coarse halftone and text), magazine mode (high frequency halftone and text), and photographic and text mode.

8. A scanning system for reproducing an image from an original document, as described in claim 5, wherein said image parameter setting includes at least one setting selected from the group comprising auto-background suppression level, lighter/darker and contrast setting, tonal reproduction curve, filter level (sharpness/descreen level), and rendering method.

9. In a scanning system for reproducing an image from an original document, a method for determining the optimum settings for image reproduction by said scanning system comprising the steps of:

reading, based on a group of current settings, an image from an original document and generating an image data file representing said document;

converting said image data file to a digital image data file having full page video characteristics and pixel characteristics contained therein;

generating a full page video histogram and a pixel tag histogram;

collecting statistics based on said full page video histogram and said pixel tag histogram;

analyzing said statistics, and generating recommended settings for image mode and image parameter settings, based on said statistics, for improving said image reproduction of said scanner;

comparing said recommended settings with current settings and generating recommended adjustments; and presenting said adjustments to a user.

10. In a scanning system for reproducing an image from an original document, a method for determining the optimum settings for image reproduction by said scanning system, as described in claim 9, wherein said image mode setting includes at least one setting selected from the group comprising general use default mode, text mode, coarse halftone mode, high frequency halftone mode, photograph mode, laser print/newpaper mode (coarse halftone and text), magazine mode (high frequency halftone and text), and photographic and text mode.

11. In a scanning system for reproducing an image from an original document, a method for determining the optimum settings for image reproduction by said scanning system, as described in claim 9, wherein said image parameter setting includes at least one setting selected from the group comprising auto-background suppression level, lighter/darker and contrast setting, tonal reproduction curve, filter level (sharpness/descreen level), and rendering method.

12. In a scanning system for reproducing an image from an original document, a method for determining the optimum settings for image reproduction by said scanning system, as described in claim 9, wherein the original document includes multiple pages said method further includes the step of storing said recommended settings for each page and when images for the full documents have been analyzed, determining recommended settings for the overall document.

* * * * *